3,508,931
CURING SALT COMPOSITIONS AND METHODS OF MAKING SAME
Louis Sair, Evergreen Park, Ill., assignor to The Griffith Laboratories, Inc., Chicago, Ill., a corporation of Illinois
No Drawing. Filed June 15, 1967, Ser. No. 646,180
Int. Cl. A23l *3/34;* A23b *1/01*
U.S. Cl. 99—222         16 Claims

ABSTRACT OF THE DISCLOSURE

A method for making free-flowing, non-caking, particulate, curing salt compositions suitable for curing meat products, which involves coating, preferably with mixing, without necessitating the presence of added water, a major proportion of sodium chloride crystals with a minor, curing proportion of substantially chemically uniform molten or heat-liquefied curing salt (nitrite and/or nitrate). This coating operation involves the use of controlled heating conditions so that substantially all of the curing salt is in a melted condition and only a minor proportion of the sodium chloride crystals is melted, but below the temperature at which any substantial amount of decomposition of the curing salt occurs and below the temperature at which a substantial proportion of the sodium chloride would melt, to coat (e.g., to distribute or spread) and bond substantially uniformly (i.e., substantially evenly) the curing salt to surfaces of the sodium chloride crystals, and to produce a curing salt composition having a substantially chemically uniform composition in different size gradations.

---

This invention relates to methods for making free-flowing, non-caking, particulate, curing salt compositions comprising sodium chloride crystals having a coating of alkali metal nitrite and/or alkali metal nitrate curing salt and having substantially uniform chemical composition in different size gradations.

As used herein, the terms "fusion," "fusing," and "fused" are intended to indicate that heat melts the nitrate and/or nitrite curing salt and not more than a minor proportion of sodium chloride and, upon cooling and resolidification of the melted material, bonding results. Further, reference herein that the curing salt substantially uniformly (i.e., substantially evenly) coats (i.e., distributes or spreads) in the molten state on sodium chloride crystals, does not necessarily require that substantially all of the surfaces of the sodium chloride crystals be coated or that the fused coating be continuous.

Since ancient times, sodium chloride has been used to preserve meat without refrigeration.

Later it was found that meat cured with sodium nitrate and/or sodium nitrite (hereinafter sometimes referred to as "nitrogen-containing curing salt" or "curing salt") produced a product having a desirable, relatively stable pink or red color. The nitrate or nitrite is reduced to nitric oxide which combines with constituents in meat to form the desired pink nitroso-hemoglobin. When only nitrates are used, effective curing was dependent upon the bacterial reduction of the nitrate to the nitrite form, and later decomposition of nitrous acid under acid reducing conditions to provide nitric oxides. Since it became apparent that the nitrate yielded nitrite, it is now common practice to include sodium nitrite with sodium nitrate.

The meat processing industry to a large extent is accustomed to purchasing its curing salt compositions in dry salt form either for dissolution in water for pickling brines, or for direct application to whole meat products, or for admixture into emulsified meat products for the production of loaf and encased products. In general, such compositions include sodium chloride and nitrogen-containing curing salt selected from the group consisting of alkali metal nitrite, alkali metal nitrate, and suitable admixtures thereof.

The use of nitrates and/or nitrites in curing meat products, however, is regulated by law because harmful physiological effects may result from the unintentional or accidental use of excess amounts of these materials.

The meat processing industry wants to use the maximum amount of nitrite that is allowed by law in order to get effective curing. There are restrictions, however, which limit the maximum amount of nitrite that can be lawfully used in curing comminuted meat such as sausage, and require that the curing composition have substantially a uniform nitrite content and properly comply with the nitrite content designated on the label.

Prior to my discovery, curing salt compositions were known which comprised mechanical mixtures having a major proportion of sodium chloride and a minor proportion of sodium nitrate and sodium nitrite. One or more of the ingredients of these curing salt compositions were subject to separation in packing, shipping, and handling, producing a non-uniform or non-homogeneous product. This separation problem left the meat processor in the dark as to the amount of nitrite and nitrate, presented problems concerning the amount of nitrite shown on labels for the products, and resulted in complaints by users and Government, and the return of such products to the manufacturer.

To obviate or overcome this separation, a flash-dried composition was made, such as disclosed in U.S. Patent 2,054,624, wherein the nitrate and/or nitrite were dissolved in a sodium chloride solution and the resulting solution was spread on hot rotating rolls. The water rapidly evaporated and the flash-dried product was scraped from the rolls to produce crystals that were smaller or finer than the physical mixture described above. Many of the resulting sodium chloride crystals were essentially single crystals of cubic shape. The flash-dried composition contained at least about 80% by weight of sodium chloride and not more than about 20% of a nitrogen-containing salt selected from the group consisting of alkali metal nitrite, alkali metal nitrate, or admixtures thereof. One such flash-dried composition had, for example, about 90 parts by weight of sodium chloride, about 4 parts by weight of sodium nitrate and about 6 parts by weight of sodium nitrite, and about 0.5% by weight moisture content. This composition had a particle size distribution of U.S. Bureau of Standards screens such as exemplified by the following:

|  | Percent |
|---|---|
| Retained on 100 mesh screen | 2 |
| Retained on 200 mesh screen | 47 |
| Passed through a 200 mesh screen | 51 |

Although the flash-dried composition obviated or overcame the serious problem of non-uniformity inherent in the physical mixture of the individual ingredients, it exhibited a great tendency to cake.

The problems confronting the art were essentially twofold:

(1) It was essential that the proportion of nitrogen-containing curing salt be substantially the same in different granule size gradations and in different sampled portions of the curing salt composition, so that Federal requirements as to chemical uniformity of the composition could be followed (e.g., the Meat Inspection Division of the U.S. Department of Agriculture, for example, now permits the amount of nitrite to vary plus or minus 10% by weight where there is more than 2% by weight nitrite, and the nitrite to vary plus or minus 15% by weight when less than 2% by weight theoretical nitrite is used).

(2) The granular product must be free-flowing and not cake or agglomerate into large aherent masses under normal storage conditions.

Patent 2,054,624 solved the first problem but did not solve the second one.

Both of these problems were resolved by inventions of U.S. Patent 3,164,480, U.S. Reissue Patent 25,996, and U.S. application Ser. No. 576,862, filed Sept. 2, 1966, issued as U.S. Patent 3,335,016. However, those inventions involved, among other things, the use of compaction, whereas my discovery substantially uniformly fuses the curing salt to sodium chloride crystals of the desired size, and obviates compaction and other associated operations required in those patents and application, to produce free-flowing, non-caking curing salt compositions of substantially uniform chemical content which are suitable for use in curing meat products.

The free-flowing, non-caking particles produced in accordance with my method of fusion have a substantially uniform chemical composition in different size gradations, are sufficiently sturdy to withstand normal handling without disintegration, and have a shape and size distribution controlled to avoid substantial face-to-face contact with other particles and thereby to obviate caking under normal storage conditions.

My method for making such free-flowing, non-caking, particulate, curing salt compositions suitable for curing meat products involves substantially uniformly coating, preferably with mixing and without necessitating the presence of added water, a major proportion of sodium chloride crystals with a minor, curing proportion of substantially chemically uniform, molten or heat-liquefied curing salt (nitrate and/or nitrite). This coating operation is conducted under controlled temperature conditions (i.e., with controlled heat-time relationship) with the curing salt at a temperature sufficiently high so as to melt substantially all of the curing salt and not more than a minor proportion of the sodium chloride crystals and thereby provide a flowable molten curing salt-sodium chloride mixture that substantially uniformly coats (i.e., distributes or spreads) itself on sodium chloride crystals, but below the temperature at which any substantial decomposition of the curing salt occurs and below the temperature at which a major proportion of the sodium chloride crystals would melt, to bond, upon cooling, substantially uniformly the curing salt to surfaces of the sodium chloride crystals. A cooled, free-flowing, non-caking, particulate curing salt composition is recovered in which the particles are not substantially increased in size over the starting material. The particles of the composition have a shape and size distribution controlled to maintain substantially no face-to-face contact of extended surfaces of the particles, whereby caking is obviated under normal storage conditions. Further, the particles of the composition have substantially uniform chemical content in different size gradations.

The curing salt constituent is an alkali metal nitrite, alkali metal nitrate, or admixture thereof.

If desired, after the molten curing salt has been bonded to the sodium chloride crystals, the resulting composition may be subjected to classification to remove any undesired agglomerates to produce a recovered free-flowing, non-caking, particulate, curing salt composition.

It is preferred to feed the curing salt (nitrate and/or nitrite), individually or together, in a solid state to solid crystalline grains of sodium chloride heated to controlled temperatures while substantially uniformly mixing (e.g., rotating drum) the materials together under controlled temperature conditions, thereby causing the substantially chemically uniform curing salt to melt substantially entirely to the liquid state and causing a minor proportion only of the sodium chloride to melt to provide a molten mixture which substantially uniformly coats the solid crystalline particles of sodium chloride. The mixture is then cooled, which completes the bonding of the curing salt on the sodium chloride crystals, followed by sifting and removing, if necessary, any large agglomerated grains of sodium chloride-containing material. (If desired, the agglomerates can be readily separated into discrete grains and, if desired, used.) The particulate, free-flowing, non-caking, curing salt composition that is recovered comprises discrete particles of sodium chloride with curing salt substantially uniformly bonded to the surfaces of the sodium chloride particles, and have a substantially uniform chemical content for all gradations of size. The recovered curing salt composition may then be packaged in containers (e.g., drums).

Alternatively, all of the constituents of curing salt composition can be mixed together at controlled temperature conditions, as opposed to first heating the sodium chloride particles.

Regardless of which of the above procedures is used, the controlled temperature conditions must melt substantially entirely the curing salt and melt a minor proportion only of the sodium chloride (e.g., up to about 30% by weight of the sodium chloride) to provide a molten flowable mixture that substantially uniformly coats the sodium chloride crystals to provide, upon cooling, granules having a substantially uniform chemical content for different gradations of size. When the constituents of the curing salt composition are thoroughly mixed, comparatively lower temperatures may be used. The temperature used, however, must be at least equal to the eutectic point of the curing salt and the melted portion of the sodium chloride. I have found that satisfactory results can be obtained when the temperature of the sodium chloride, curing salt or mixture of curing salt and sodium chloride are at at least about 500° F., preferably at at least about 550° F. or 625° F. When comparatively higher temperatures are used (below the point at which substantial decomposition of the curing salt occurs and below the temperature at which a major proportion of the sodium chloride melts), one obtains a particulate coating composition that is more chemically uniform, and less moisture pickup results.

The resulting molten mixture of the constituents forms on surfaces of the sodium chloride crystals and, at least to some extent, coats (i.e., distributes or spreads over) surfaces of the sodium chloride crystals to form, upon cooling, a substantially uniform bonded coating; and although the coating may not be continuous, it is substantially uniform, upon cooling, in the sense that it is substantially evenly spread or distributed on the sodium chloride crystals. The molten mixture of curing salt and limited amount of sodium chloride enters and penetrates any capillary cracks within the sodium chloride crystals as well as any narrow spaces in the sodium chloride crystals. It will not, however, penetrate the surface of a perfect sodium chloride crystal, nor will it impregnate the sodium chloride crystal lattice.

It is desirable initially to use grains or particles of sodium chloride crystals of a size sufficient to enable a substantial portion (i.e., at least 50% by weight) of the grains to be retained on a 40, 50, or 80 mesh screen. If desired, the curing salt initially used in my method may be in the form of a powder, and the curing salt powder may be applied as such to heated particulate crystals of sodium chloride in the manner described with respect to my preferred method.

Suitable curing salt compositions can be made having, for example, at least about 80% by weight of sodium chloride and not more than about 20% by weight of curing salt (nitrite and/or nitrate).

Although water need not be added to constituents of the curing salt composition, a small controlled amount of water can be added (e.g., less than about 2% water or moisture, based on the total weight of sodium chloride and curing salt). When a controlled amount of water is present, it is evaporated before the requisite controlled temperature conditions effect the coating operation and, upon cooling, completion of the bonding operation. Added water, however, has not been found to offer improved results, and I prefer not to add water.

My process may be practiced on either a batch basis or a continuous production basis.

Although U.S. Patents 2,054,625 and 3,275,459 disclose the application of limited levels of heat in making various curing salt compositions, neither of these patents show the utilization of my new and unobvious process conditions to produce my compositions, as described herein.

The following examples, including the proportions, temperatures, conditions and length of time of heating, nature of the sodium chloride and curing salt, and manipulative steps, include or show certain illustrative embodiments of my invention and requisite conditions of my invention. They also show conditions which should be avoided.

EXAMPLE I

The following curing salt composition was prepared by substantially uniformly mixing the specified ingredients:

|  | Percent by weight |
|---|---|
| Sodium chloride (fine flake salt) | 86 |
| Sodium nitrite | 12 |
| Sodium nitrate | 2 |

A screen analysis was taken of the composition and the percent by weight nitrite was determined for each screen size. The composition was placed in an oven at about 525° F. for about two hours, and was then subjected to the same screen analysis and nitrite determination.

Table I below shows the screen analysis of the composition both before and after heat treatment.

TABLE I

| Screen size of composition | Percent by weight of composition before heating | Percent by weight of composition after heating |
|---|---|---|
| On 60 mesh | 38 | 57 |
| On 80 mesh | 37 | 23 |
| Through 80 mesh | 26 | 20 |

Table II below shows the percent by weight nitrite of each screen size of the composition both before and after heat treatment.

TABLE II

| Screen size of composition | Percent by weight nitrite before heating at about 525° F. | Percent by weight nitrite after heating at about 525° F. |
|---|---|---|
| On 60 mesh | 17.8 | 16.6 |
| On 80 mesh | 7.1 | 7.2 |
| Through 80 mesh | 14.0 | 8.4 |

Table II above shows that the composition did not have uniform nitrite content for the different size gradations either before or after heat treatment. Further, it shows that the nitrite did not uniformly coat and uniformly fuse to the individual sodium chloride crystals under the particular heating conditions selected and in the absence of agitation.

EXAMPLE II

The procedure of Example I above was followed using a different curing salt composition.

The following composition was prepared by substantially uniformly mixing the specified ingredients:

|  | Percent by weight |
|---|---|
| Sodium chloride (fine flake salt) | 90 |
| Sodium nitrite | 6 |
| Sodium nitrate | 4 |

A screen analysis was taken of the composition and the percent by weight nitrite was determined for each screen size. The composition was placed in an oven at about 525° F. for about two hours, and was then subjected to the same screen analysis and nitrite determination.

Table III below shows the screen analysis of the composition both before and after heat treatment.

TABLE III

| Screen size of composition | Percent by weight of composition before heating | Percent by weight of composition after heating |
|---|---|---|
| On 60 mesh | 26 | 23 |
| On 80 mesh | 40 | 38 |
| Through 80 mesh | 30 | 40 |

Table IV below shows the percent by weight nitrite of each screen size of the composition both before and after heat treatment.

TABLE IV

| Screen size of composition | Percent by weight nitrite before heating at about 525° F. | Percent by weight nitrite after heating at about 525° F. |
|---|---|---|
| On 60 mesh | 13.2 | 12.5 |
| On 80 mesh | 3.2 | 4.7 |
| Through 80 mesh | 4.4 | 4.0 |

Table IV above shows that the composition did not have uniform nitrite content for the different size gradations either before or after heat treatment. Further, it shows that the nitrite did not uniformly coat and uniformly fuse to the individual sodium chloride crystals under the particular heating conditions selected and in the absence of agitation. These results substantially correspond with those of Example I above.

EXAMPLE III

Sodium chloride crystals were used having the following screen analysis:

| Screen size of sodium chloride: | Percent by weight |
|---|---|
| On 40 mesh | 90 |
| Through 40 mesh | 10 |

Sodium nitrite and sodium nitrate crystals were used having the following respective screen analyses:

TABLE V

| Screen size | Percent by weight of sodium nitrite | Percent by weight of sodium nitrate |
|---|---|---|
| On 40 mesh | 9 | 2 |
| On 60 mesh | 42 | 4 |
| On 80 mesh | 17 | 4 |
| Through 80 mesh | 32 | 90 |

The sodium nitrite and sodium nitrate were ground together so that the mix would pass through a 400 mesh screen. The resulting ground mix was substantially uniformly mixed with the sodium chloride to provide the following curing salt composition:

|  | Percent by weight |
|---|---|
| Sodium chloride | 90 |
| Sodium nitrite | 6 |
| Sodium nitrate | 4 |

Twenty-gram samples of the composition were placed in separate stainless steel trays (3 inches wide by 6 inches in length and ½ inch in depth), and the trays were placed in a muffle furnace that had been heated to about 725° F. The trays remained in the furnace for periods of 2, 5, and 10 minutes, respectively.

Table VI below shows the screen analysis and the percent by weight nitrite of each of the samples that had been heated for periods of 2, 5, and 10 minutes, respectively.

TABLE VI

| Time (minutes) heated at about 725° F. | Screen size | Weight percent for screen sizes after heating at about 725° F. | Percent by weight of nitrite after heating at about 725° F. |
|---|---|---|---|
| 2 | On 40 mesh | 93 | 6.0 |
|   | Through 40 mesh | 7 | 6.3 |
| 5 | On 40 mesh | 91 | 6.08 |
|   | Through 40 mesh | 9 | 6.0 |
| 10 | On 40 mesh | 90 | 5.88 |
|   | Through 40 mesh | 10 | 6.08 |

The results shown in Table VI above show that the above-described procedure of heat treatment caused the nitrite to substantially uniformly coat and fuse to discrete sodium chloride crystals while the curing salt (nitrite and nitrate) only was completely in a molten state. The resulting heat-treated curing salt compositions had substantially uniform chemical content for different size gradations of sodium chloride crystals having fused curing salt.

EXAMPLE IV

Unground sodium nitrite and sodium nitrate crystals were used having the following respective screen analysis:

TABLE VII

| Screen size | Percent by weight sodium nitrite | Percent by weight sodium nitrate |
|---|---|---|
| On 40 mesh | 9 | 2 |
| On 60 mesh | 42 | 4 |
| On 80 mesh | 17 | 4 |
| Through 80 mesh | 32 | 90 |

The sodium nitrite and sodium nitrate were substantially uniformly mixed with sodium chloride crystals (sodium chloride of the size shown in Example III above) to provide the following curing salt composition:

Percent by weight
Sodium chloride _____ 90
Sodium nitrite _____ 6
Sodium nitrate _____ 4

Twenty-gram samples of the composition were placed in separate stainless steel trays (about ¼ inch in depth), and the trays were placed in a muffle furnace that had been heated to about 725° F. The trays remained in the furnace for periods of 2, 5, and 10 minutes, respectively.

Table VIII below shows the screen analysis and the percent by weight nitrite of each of the samples that had been heated for periods of 2, 5, and 10 minutes, respectively. The table also shows a "control" sample of the same composition; however, this particular sample was not heated, as were the other samples.

TABLE VIII

| Time (minutes) heated at about 725° F. | Screen size | Weight percent for screen sizes after heating at about 725° F. | Percent by weight of nitrite after heating at about 725° F. |
|---|---|---|---|
| Control (0) | On 40 mesh | [1] 80 | [1] 0.80 |
|   | Through 40 mesh | [1] 20 | [1] 33.5 |
| 2 | On 40 mesh | 93 | 5.10 |
|   | Through 40 mesh | 7 | 7.50 |
| 5 | On 40 mesh | 94 | 6.10 |
|   | Through 40 mesh | 6 | 5.70 |
| 10 | On 40 mesh | 94 | 6.10 |
|   | Through 40 mesh | 6 | 7.20 |

[1] Not heated.

The results shown in Table VIII above show that the above-described procedure of heat treatment caused the nitrite to coat and fuse to discrete sodium chloride crystals while the curing salt (nitrite and nitrate) only was completely in a molten state. The unheated composition, the "control," had a marked variation of nitrite content in each of the two size gradations, whereas the heat-treated curing salt compositions had a more uniform chemical content than the unheated composition for different size gradations of sodium chloride crystals having fused curing salt. The chemical uniformity of the heated compositions was not as good here as was obtained in Example III above, presumably because the nitrate and nitrite were coarser.

EXAMPLE V

Sodium nitrite and sodium nitrate crystals were each ground so as to pass through a 100 mesh screen.

The sodium nitrite and sodium nitrate were substantially uniformly mixed with sodium chloride crystals (sodium chloride of the size shown in Example III above) to provide the following curing salt composition:

Percent by weight
Sodium chloride _____ 90
Sodium nitrite _____ 6
Sodium nitrate _____ 4

Twenty-gram samples of the composition were placed in separate stainless steel trays, and the trays were placed in a muffle furnace that had been heated to about 725° F. The trays remained in the furnace for periods of 2, 5, and 10 minutes, respectively.

Table IX below shows the screen analysis and the percent by weight nitrite of each of the samples that had been heated for periods of 2, 5, and 10 minutes, respectively.

TABLE IX

| Time (minutes) heated at about 725° F. | Screen size | Weight percent for screen sizes after heating at about 725° F. | Percent by weight of nitrite after heating at about 725° F. |
|---|---|---|---|
| 2 | On 40 mesh | 95 | 5.2 |
|   | Through 40 mesh | 5 | 9.1 |
| 5 | On 40 mesh | 94 | 6.0 |
|   | Through 40 mesh | 6 | 6.45 |
| 10 | On 40 mesh | 94.3 | 5.5 |
|   | Through 40 mesh | 5.7 | 5.6 |

The results shown in Table IX above show that, with respect to the samples which were heated for 5 and 10 minutes, the above-described procedure of heat treatment caused the nitrite to substantially uniformly coat and fuse to discrete sodium chloride crystals while the curing salt (nitrite and nitrate) only was completely in a molten state. The resulting heat-treated curing salt compositions that were heat-treated for 5 and 10 minutes had substantially uniform chemical content for different size gradations of sodium chloride crystals having fused curing salt. However, the composition that was heated for only two minutes had a variation of nitrite content for the different size gradations.

EXAMPLE VI

Sodium nitrite and sodium nitrate crystals were each ground so as to pass through a 100 mesh screen.

The sodium nitrite and sodium nitrate were substantially uniformly mixed with sodium chloride crystals (which is predominantly retained on a 50 mesh screen) to provide the following curing salt composition:

Percent by weight
Sodium chloride_____ 90
Sodium nitrite_____ 6
Sodium nitrate_____ 4

Twenty-gram samples of the composition were placed separately in a muffle furnace that had been heated to about 725° F. The samples remained in the furnace for periods of 2, 5, and 10 minutes, respectively.

Table X below shows the screen analysis and the percent by weight nitrite of each of the samples that had been heated for periods of 2, 5, and 10 minutes, respectively.

TABLE X

| Time (minutes) heated at about 725° F. | Screen size | Weight percent for screen sizes after heating at about 725° F. | Percent by weight of nitrite after heating at about 725° F. |
|---|---|---|---|
| 2 | On 50 mesh | 84 | 2.7 |
|   | Through 50 mesh | 16 | 19.4 |
| 5 | On 50 mesh | 92 | 6.6 |
|   | Through 50 mesh | 8.0 | 6.5 |
| 10 | On 50 mesh | 91 | 5.3 |
|   | Through 50 mesh | 9 | 6.7 |

The results shown in Table X above show that, with respect to the sample which was heated for 5 minutes, the above-described procedure of heat treatment caused the nitrite to substantially uniformly coat and fuse to discrete sodium chloride crystals while the curing salt (nitrite and nitrate) only was completely in a molten state. The resulting heat-treated curing salt composition that was heat-treated for 5 minutes had substantially uniform chemical content for different size gradations of sodium chloride crystals having fused curing salt. However, the composition that was heated for 2 minutes had a marked variation of nitrite content, presumably due to decomposition of curing salt. The composition that was heated for 10 minutes had curing salt fused to the sodium chloride crystals but had some variation of nitrite content, presumably due to incomplete melting of the curing salt.

EXAMPLE VII

Ten pounds were prepared of a substantially uniform mixture of the following curing salt composition:

Percent by weight
Sodium chloride _____ 90
Sodium nitrite _____ 6
Sodium nitrate _____ 4

This mixture was prepared by adding the sodium chloride crystals to a calcining type, rotating drum (21 inches long and having an internal diameter of 11½ inches) that could be heated. A single gas burner was used to raise the temperature of the sodium chloride in the drum to a temperature range of 608° F. to 630° F. The temperature was then slowly raised in order to raise the temperature of the sodium chloride to about 680° F. Ground curing salt (nitrite and nitrate) was then added to the heated sodium chloride in the drum. It was noted that a portion of the product stuck to the drum. The drum was tilted upwardly at its open end about 20°.

The drum was then closed and rotated, without applying further heat, for about ten minutes. The resulting The drum was then closed and rotated, without applying further heat, for about ten minutes. The resulting fused, curing salt composition was at a temperature of about 700° F. The composition was removed from the drum.

The nitrite substantially uniformly coated and fused to discrete sodium chloride crystals while the curing salt (nitrite and nitrate) only was completely in a molten state. The curing salt composition appeared to have a substantially uniform chemical content (i.e., 5.95% nitrite).

EXAMPLE VIII

The composition of Example VII above was used in this run.

The sodium chloride crystals were added to the drum referred to in Example VII above and the sodium chloride was heated to about 700° F. The curing salt (nitrite and nitrate) was then added to the drum. It was noted that the resulting product started to cake. The heat was turned off and the drum was rotated for about 10 minutes, during which time a rod and spatula were used to scrape the product from the wall of the drum. A fan was then used to accelerate cooling of the product and prevent the product from sticking to the wall of the drum. The composition was removed from the drum.

The nitrite substantially uniformly coated and fused to discrete sodium chloride crystals while the curing salt (nitrite and nitrate) only was completely in a molten state. The curing salt composition had a substantially uniform chemical content. Sampled portions of the composition had a nitrite content of 5.7% and 6.0%, respectively.

EXAMPLE IX

The composition of Example VII above was used in this run.

The sodium chloride crystals were added to the drum referred to in Example VII above and the sodium chloride was heated to about 750° F. Heating was discontinued and after about five minutes the temperature of the sodium chloride dropped to about 660° F. The drum was then rotated until the sodium chloride reached a temperature of about 626° F. The curing salt (nitrite and nitrate) was then added to the drum and the drum was rotated for about 10 minutes.

The curing salt composition was removed from the drum in a free-flowing condition. Three different samples of the composition were analyzed for nitrite and were found to have respective nitrite values of 5.85%, 5.9%, and 5.9%.

Table XI below shows the percent by weight nitrite of different screen sizes of the heat treated curing salt composition.

TABLE XI

| Screen size of heat treated composition | Percent by weight of heat treated composition | Percent by weight of nitrite of heat treated composition |
|---|---|---|
| On 50 mesh | 92 | 5.92 |
| Through 50 mesh | 8 | 5.7 |

The results shown in Table XI above show that the nitrite substantially uniformly coated and fused to discrete sodium chloride crystals while the curing salt (nitrite and nitrate) only was completely in a molten state. The curing salt composition had a substantially uniform chemical content for the different size gradations.

EXAMPLE X

The following curing salt composition was prepared by substantially uniformly mixing the specified ingredients:

Percent by weight
Sodium chloride (fine flake salt) _____ 86
Sodium nitrite _____ 12
Sodium nitrate _____ 2

A screen analysis was taken of the composition and the percent by weight nitrite was determined for each screen size. The composition was placed in an oven at about 910° F. to 950° F. for about 3 hours, and was then subjected to the same screen analysis and nitrite determination.

Table XII below shows the screen analysis of the composition both before and after heat treatment.

TABLE XII

| Screen size of composition | Percent by weight of composition before heating | Percent by weight of composition after heating |
|---|---|---|
| On 60 mesh | 24.4 | 24.5 |
| On 80 mesh | 37.8 | 22.5 |
| Through 80 mesh | 37.8 | 53.0 |

Table XIII below shows the percent by weight nitrite of each screen size of the composition both before and after heat treatment.

TABLE XIII

| Screen size of composition | Percent by weight nitrite before heating at about 910°-950° F. | Percent by weight nitrite after heating at about 910°-950° F. |
|---|---|---|
| On 60 mesh | 17.8 | 3.6 |
| On 80 mesh | 7.1 | 3.1 |
| Through 80 mesh | 14.0 | 3.2 |

Table XIII above shows that the composition did not have uniform nitrite content for the different size gradations before heat treatment. Further, it shows that the nitrite did uniformly coat and uniformly fuse to the individual sodium chloride crystals under the particular heating conditions selected, and indicates that nitrite apparently decomposed at the high temperatures used. The heat-treated composition had a substantially uniform chemical content for the different size gradations.

EXAMPLE XI

The procedure of Example X above was followed using a different curing salt composition.

The following composition was prepared by substantially uniformly mixing the specified ingredients:

| | Percent by weight |
|---|---|
| Sodium chloride (fine flake salt) | 90 |
| Sodium nitrite | 6 |
| Sodium nitrate | 4 |

A screen analysis was taken of the composition and the percent by weight nitrite was determined for each screen size. The composition was placed in an oven at about 910° F. to 950° F. for about 3 hours, and was then subjected to the same screen analysis and nitrite determination.

Table XIV below shows the screen analysis of the composition both before and after heat treatment.

TABLE XIV

| Screen size of composition | Percent by weight of composition before heating | Percent by weight of composition after heating |
|---|---|---|
| On 60 mesh | 23.8 | 27.0 |
| On 80 mesh | 38.3 | 33.5 |
| Through 80 mesh | 37.9 | 39.5 |

Table XV below shows the percent by weight nitrite of each screen size of the composition both before and after heat treatment.

TABLE XV

| Screen size of composition | Percent by weight nitrite before heating at about 910°–950° F. | Percent by weight nitrite after heating at about 910°–950° F. |
|---|---|---|
| On 60 mesh | 13.2 | 2.5 |
| On 80 mesh | 3.2 | 2.2 |
| Through 80 mesh | 4.4 | 2.1 |

Table XV above shows that the composition did not have uniform nitrite content for the different size gradations before heat treatment. Further, it shows that the nitrite did uniformly coat and uniformly fuse to the individual sodium chloride crystals under the particular heating conditions selected, and indicates that nitrite apparently decomposed at the high temperatures used. The heat-treated composition had a substantially uniform chemical content for the different size gradations. These results substantially correspond with those of Example X above.

EXAMPLE XII

The following curing salt composition was prepared by substantially uniformly mixing the specified ingredients:

| | Percent by weight |
|---|---|
| Sodium chloride (fine flake salt) | 86 |
| Sodium nitrite | 12 |
| Sodium nitrate | 2 |

A screen analysis was taken of the composition and the percent by weight nitrite was determined for each screen size. The composition was placed in an oven at about 700°–750° F. for about 3 hours, and was then subjected to the same screen analysis and nitrite determination.

Table XVI below shows the screen analysis of the composition both before and after heat treatment.

TABLE XVI

| Screen size of composition | Percent by weight of composition before heating | Percent by weight of composition after heating |
|---|---|---|
| On 60 mesh | 24.4 | 25.0 |
| On 80 mesh | 37.8 | 37.0 |
| Through 80 mesh | 37.8 | 38.0 |

Table XVII below shows the percent by weight nitrite of each screen size of the composition both before and after heat treatment.

TABLE XVII

| Screen size of composition | Percent by weight nitrite before heating at about 700°–750° F. | Percent by weight nitrite after heating at about 700°–750° F. |
|---|---|---|
| On 60 mesh | 17.8 | 11.4 |
| On 80 mesh | 7.1 | 10.8 |
| Through 80 mesh | 14.0 | 10.4 |

Table XVII above shows that the composition did not have uniform nitrite content for the different size gradations before heat treatment. Further, it shows that the nitrite did substantially uniformly coat and substantially uniformly fuse to the individual sodium chloride crystals under the particular heating conditions selected, but during heating some nitrite apparently decomposed. The heat-treated composition had a substantially uniform chemical content for the different gradations of size.

EXAMPLE XIII

The procedure of Example XII above was followed using a different curing salt composition.

The following composition was prepared by substantially uniformly mixing the specified ingredients:

| | Percent by weight |
|---|---|
| Sodium chloride (fine flake salt) | 90 |
| Sodium nitrite | 6 |
| Sodium nitrate | 4 |

A screen analysis was taken of the composition and the percent by weight nitrite was determined for each screen size. The composition was placed in an oven at about 700°–750° F. for about 3 hours, and was then subjected to the same screen analysis and nitrite determination.

Table XVIII below shows the screen analysis of the composition both before and after heat treatment.

TABLE XVIII

| Screen size of composition | Percent by weight of composition before heating | Percent by weight of composition after heating |
|---|---|---|
| On 60 mesh | 23.8 | 25.0 |
| On 80 mesh | 38.3 | 38.0 |
| Through 80 mesh | 37.9 | 37.0 |

Table XIX below shows the percent by weight nitrite of each screen size of the composition both before and after heat treatment.

TABLE XIX

| Screen size of composition | Percent by weight nitrite before heating at about 700°–750° F. | Percent by weight nitrite after heating at about 700°–750° F. |
|---|---|---|
| On 60 mesh | 13.2 | 5.95 |
| On 80 mesh | 3.2 | 5.70 |
| Through 80 mesh | 4.4 | 5.6 |

Table XIX above shows that the composition did not have uniform nitrite content for the different size gradations before heat treatment. Further, it shows that the nirite did uniformly coat and uniformly fuse to the individual sodium chloride crystals under the particular heating conditions selected. The heat-treated composition had a substantially uniform chemical content for the different gradations of size.

The foregoing detailed description has been given for clearness of understanding only, and no unnecessary limitations should be understood therefrom, as modifications will be obvious to those skilled in the art.

I claim:

1. A method for making free-flowing, non-caking, particulate, curing salt compositions suitable for curing meat products, which comprises coating a major proportion of particulate sodium chloride crystals with a minor, curing proportion of curing salt selected from the group consisting of alkali metal nitrates, alkali metal nitrites, and admixtures thereof, said coating operation being conducted with controlled temperature conditions of more than about 500° F. in the substantial absence of water so that substantially all of said curing salt is in a molten state but does not undergo substantial decomposition and a minor proportion only of said sodium chloride crystals melts, to provide a molten curing salt-sodium chloride mixture, which, upon cooling, bonds to the sodium chloride crystals, and recovering a free-flowing, non-caking curing salt composition having particles of controlled shape and size distribution to avoid substantial face-to-face contact with other particles and thereby obviate caking under normal storage conditions, having particles of substantially uniform chemical content in substantially all gradations of size, and having particles which are sufficiently sturdy to withstand normal handling without disintegration.

2. The method of claim 1 wherein said coating operation under controlled temperature conditions involves applying curing salt powder to heated particulate crystals of sodium chloride to form said molten curing salt-sodium chloride mixture.

3. The method of claim 1 wherein a solid admixture of particulate sodium chloride crystals and particulate curing salt is subjected to said controlled temperature conditions to produce said molten curing salt-sodium chloride mixture.

4. The method of claim 1 wherein said sodium chloride crystals and said molten curing salt are subjected to mixing during said coating operation.

5. The method of claim 1 wherein after said molten curing salt has been bonded to said sodium chloride crystals, the resulting composition is subjected to classification to remove undesired agglomerates to produce said recovered free-flowing, non-caking, particulate, curing salt composition.

6. The method of claim 1 wherein not more than about 20% by weight curing salt is bonded to at least about 80% by weight sodium chloride.

7. The method of claim 1 wherein said recovered particles of free-flowing, non-caking, curing salt composition are not substantially larger than said crystals of sodium chloride used in said coating operation.

8. The method of claim 1 wherein a substantial proportion of said crystals of sodium chloride used in said coating operation is retained on an 80 mesh screen.

9. The method of claim 1 wherein said temperature conditions involve a temperature of at least about 625° F.

10. The method of claim 1 wherein not more than about 30% by weight of said sodium chloride is present in said molten curing salt-sodium chloride mixture.

11. A method for making free-flowing, non-caking, particulate, curing salt compositions suitable for curing meat products, which comprises introducing a minor, curing proportion of curing salt selected from the group consisting of alkali metal nitrates, alkali metal nitrites, and admixtures thereof, to a major proportion of preheated particulate sodium chloride crystals, admixing said curing salt and sodium chloride crystals to substantially uniformly coat said sodium chloride crystals with molten curing salt, said coating operation being conducted with a controlled temperature condition of more than about 500° F. in the substantial absence of water so as to melt a minor proportion only of said sodium chloride crystals and to provide substantially all of said curing salt in a molten state, but with a temperature condition below which any substantial decomposition of the curing salt occurs and below which a major proportion of the sodium chloride melts, to provide a molten curing salt-sodium chloride mixture which, upon cooling, substantially uniformly bonds to the particles of sodium chloride crystals, and recovering a free-flowing, non-caking curing salt composition having particles of controlled shape and size distribution to avoid substantial face-to-face contact with other particles and thereby obviate caking under normal storage conditions, having particles of substantially uniform chemical content in substantially all gradations of size, and having particles which are sufficiently sturdy to withstand normal handling without disintegration.

12. The method of claim 11 wherein not more than about 30% by weight of said sodium chloride is present in said molten curing salt-sodium chloride mixture.

13. The method of claim 11 wherein said temperature condition involves a temperature of at least about 550° F.

14. The method of claim 11 wherein said temperature condition involves a temperature of at least about 625° F.

15. A method for making free-flowing, non-caking, particulate, curing salt compositions suitable for curing meat products, which comprises mixing a major proportion of particulate sodium chloride crystals with a minor, curing proportion of particulate curing salt selected from the group consisting of alkali metal nitrates, alkali metal nitrites, and admixtures thereof, under controlled temperature conditions of more than about 500° F. in the substantial absence of water to substantially uniformly coat said sodium chloride crystals with melted curing salt, said coating operation being conducted with said curing salt at a temperature condition sufficiently high so as to melt substantially all of said particulate curing salt and to melt a minor proportion only of said sodium chloride crystals, but at a temperature condition below which any substantial decomposition of the curing salt occurs and below which a major proportion of the sodium chloride melts, to provide a molten curing salt-sodium chloride mixture which, upon cooling, substantially uniformly bonds to the sodium chloride crystals, and recovering a free-flowing, non-caking, curing salt composition having particles of controlled shape and size distribution to avoid substantial face-to-face contact with other particles and thereby obviate caping under normal storage conditions, having particles of substantially uniform chemical content in substantially all gradations of size, and having particles which are sufficiently sturdy to withstand normal handling without disintegration.

16. A free-flowing, non-caking curing salt composition suitable for curing meat products having particles of controlled shape and size distribution to avoid substantial face-to-face contact with other particles and thereby obviate caking under normal storage conditions, having particles of substantially uniform chemical content in substantially all gradations of size, and having particles which are sufficiently sturdy to withstand normal handling without disintegration, said curing salt composition being produced by a method which comprises coating a major proportion of particulate sodium chloride crystals with a minor, curing proportion of curing salt selected from the group consisting of alkali metal nitrates, alkali metal nitrites, and admixtures thereof, said coating operation being conducted with controlled temperature conditions of more than about 500° F. in the substantial absence of water so that substantially all of said curing salt is in a molten state but does not undergo substantial decomposition and a minor proportion only of said sodium chloride crystals melts, to provide a molten curing salt-sodium chloride mixture, which, upon cooling, bonds to the sodium chloride crystals, and recovering said free-flowing, non-caking curing salt composition.

References Cited

UNITED STATES PATENTS

| 2,054,624 | 9/1936 | Griffith | 99—222 |
| 2,054,625 | 9/1936 | Griffith | 99—222 |

HYMAN LORD, Primary Examiner

U.S. Cl. X.R.

99—159